United States Patent [19]
Gohlke

[11] Patent Number: 4,948,964
[45] Date of Patent: Aug. 14, 1990

[54] ARTIFICIAL TARGET FOR AUTOMATIC GAIN NORMALIZATION

[75] Inventor: Mark A. Gohlke, Garland, Tex.

[73] Assignee: Texas Instruments Incorporated, Dallas, Tex.

[21] Appl. No.: 143,988

[22] Filed: Jan. 14, 1988

[51] Int. Cl.⁵ .............................................. H04N 5/33
[52] U.S. Cl. .................................. 250/350; 250/252.1; 250/332; 250/334; 250/349; 250/351
[58] Field of Search ............... 250/252.1 A, 332, 334, 250/351, 349, 350; 358/113

[56]  References Cited
U.S. PATENT DOCUMENTS 3,576,944  5/1971  LaBaw ................................. 358/113
3,895,182  7/1975  Trilling .............................. 358/113
3,971,886  7/1976  Chow ................................. 358/113
4,225,883  9/1980  Van Atta et al. .................... 250/334
4,712,010  12/1987  Alm ................................... 250/334

FOREIGN PATENT DOCUMENTS

1273707  5/1972  United Kingdom ................ 358/113
1347477  2/1974  United Kingdom ................ 358/113

Primary Examiner—Carolyn E. Fields
Attorney, Agent, or Firm—René E. Grossman

[57] ABSTRACT

The disclosure relates to a system for on-line normalization of the outputs of all of the detector elements of an infrared detector wherein, during the retrace period of the scanning mirror, infrared energy from a controlled thermoelectric source is reflected first from a high reflectivity sector of a rotating mirror and then from a relatively low reflectivity sector of the rotating mirror onto the detector. The detector output for the high and low reflectivity input signals is analyzed on a channel by channel basis by software controlled hardware and the gain of each channel is then adjusted in response thereto by the software controlled hardware individually. In this manner, each channel is caused to provide the same output for an identical input thereto.

18 Claims, 7 Drawing Sheets

ARTIFICIAL TARGET FOR AUTOMATIC GAIN NORMALIZATION

BACKGROUND OF THE INVENTION

1. Field of the Invention

This invention relates to a system for automatic channel to channel gain balance and DC restoration for an infrared detector and, more specifically, to a system for compensation for differences from element to element of an infrared detector.

2. Brief Description of the Prior Art

Typically, forward looking infrared (FLIR) systems, which are cameras capable of seeing in the dark, have, as an essential element thereof, an infrared detector. An infrared linear array is generally utilized as the detector, such arrays comprising a matrix of detector elements, wherein the scene being observed is optically scanned across the detector elements. The detector elements then each detect the magnitude of the energy in the portion of the scene scanned thereacross and each detector element then provides an output signal indicative of such energy detection.

A problem encountered in such detector systems is that each detector element in the array usually has a slightly different sensitivity to the infrared energy detected in the scene than do the other detector elements in the array. Therefore, if the output signal indicative of magnitude of energy detected is taken from each detector element and fed to, for example, a television output, each of the outputs would not be normalized. This is due to the fact that each detector has a slightly different output as a function of input energy. It is therefore apparent that an adjustment must be made on the basis of each detector element in the event the system is to be normalized wherein each detector will provide the same output for the same input or, in other words, that each detector will have the same sensitivity.

Attempts to solve this problem have been made in the past. One such known system provided a potentiometer on each channel (at the output from each detector). Therefore, assuming a detector with 180 channels, a technician was required to adjust 180 potentiometers in conjunction with specialized test equipment in order to provide the required normalization. Other attempts have also required special external test equipment in addition to a technician to operate such equipment. Each of these prior art normalization schemes has further required that the system be taken out of service during normalization, thereby preventing use thereof. It is therefore readily apparent that an improved system which avoids these disadvantages is highly desirable.

SUMMARY OF THE INVENTION

In accordance with the present invention, it is possible to automatically, internally, with no outside intervention, normalize the gains of the different channels.

Briefly, the above is accomplished by providing an infrared detector which is capable of viewing a scene via a scanning mirror. Optics are provided between the scanning mirror and the detector for focussing the scene onto the detector. The scanning mirror scans the infrared energy from the scene across the detector array to allow the detectors to receive the energy across the scene. The scanning mirror normally scans in one direction and then rapidly retraces to start the next scan. During retrace of the scanning mirror, a chopping mirror, which can be, for example, in the shape of a sector of a circle, a mirror which is periodically placed into and out of the path of the infrared energy from the scene, or the like, comes into the optical path, blocks off the energy from the scanning mirror to the detector and reflects into the detector infrared energy from a thermal reference source in the form of, for example, a thermoelectric cooler (TEC). The thermal reference source is controllable to provide a desired temperature on line. It should be understood that any controllable uniform temperature source can be substituted for the thermal reference source.

The energy from the thermal reference source is reflected onto the detector during retrace by the chopper mirror as noted above. The action of the chopper mirror into the optical path from scanner to detector can be reciprocating, as above stated, rotary or other means. In the preferred embodiment, the chopper mirror is controlled via a phase locked control loop. The chopper mirror has areas thereon of two different reflectances, one being a so-called full reflectance area which is preferably at least about 96% reflective and, more desirably, about 98% reflective and the other area being lower reflectance, preferably on the order of 34 to 40% reflectance. Of importance is that there be a known difference in reflectance of the two areas on the chopper mirror.

The specific reflectances can be created, for example, by applying optical coatings to the diamond turned, mirror finish, aluminum surface of a raw chopper mirror. The coatings are designed using conventional mathematical processes and built with successive layers of metallic and dielectric coatings to give the specific reflectances required as is known. Therefore, about 98% of the received energy from the thermal reference source is reflected onto the detector when the high reflectance portion of the chopping mirror is in the optical path and about 34 to 40% of the received energy is reflected onto the detector when the lower reflectance portion of the chopping mirror is in the optical path. The remaining 60 to 66% of the energy not reflected by the lower reflectance portion of the chopping mirror is absorbed by the chopping mirror and re-emitted at some level additionally dependent on the chopping mirror temperature and other factors. The energy received by the detector from the lower reflectance portion of the chopping mirror is a combination of energies from the thermal reference source and from the chopping mirror. In effect, the chopping mirror changes the apparent temperature of the thermal reference source, as viewed by the detector, from the lower reflectance portion of the chopping mirror. The detector therefore appears to be viewing the thermal reference source followed by the thermal reference source as modified by the lower reflectance portion of the chopping mirror. The apparent relative temperatures of these two views of the thermal reference source are variable, depending upon various factors. These factors are taken into consideration by the microprocessor when calculating the apparent delta temperature between these views. It can be seen that each detector therefore sees the same amount of difference in energy between the high reflectance surface and the low reflectance surface of the chopping mirror.

The output of each detector element of the detector is fed to the image processor via an amplifier and A/D converter. The circuitry in the image processor then takes the individual gains for each detector, determines the difference between the detected voltage received from each detector element and the expected value as calculated by the microprocessor and then adjusts the individual channels so that the delta t or temperature change detected is the same for each channel. In this manner each channel provides the same delta V or voltage change at its output indicative of the same temperature change. This is accomplished by software and timing hardware in the image processor.

The image processor is an arrangement of hardware controlled by a microprocessor, not the same as the system microprocessor. This software and hardware determines when the low and high temperatures are being sampled by the detector, takes the difference therebetween and adjusts the gain for each channel so that the output from each channel is the same and equal to the desired or prescribed absolute value.

During the flyback or retrace period of the scanner and when the high reflectance portion of the chopping mirror is in the field of view or in the optical path, the output of the amplifier of each detector element is clamped to a specific voltage while viewing the thermoelectric cooler. The thermoelectric cooler temperature is adjusted to the approximate average temperature of the scene so that the temperatures to which the system is clamped will be within the dynamic range of the scene. This number is calculated by a separate algorithm in the image processor and provides the control for the thermoelectric cooler or source.

Also provided is a system microprocessor which is under the control of the TEC temperature and the temperature of the chopper mirror. This provides correction by taking into account the temperature of the chopping mirror itself to calculate the expected delta T as a function of those values and provide an apparent delta T value to the image processor.

DESCRIPTION OF THE PREFERRED EMBODIMENT

Figure 1:
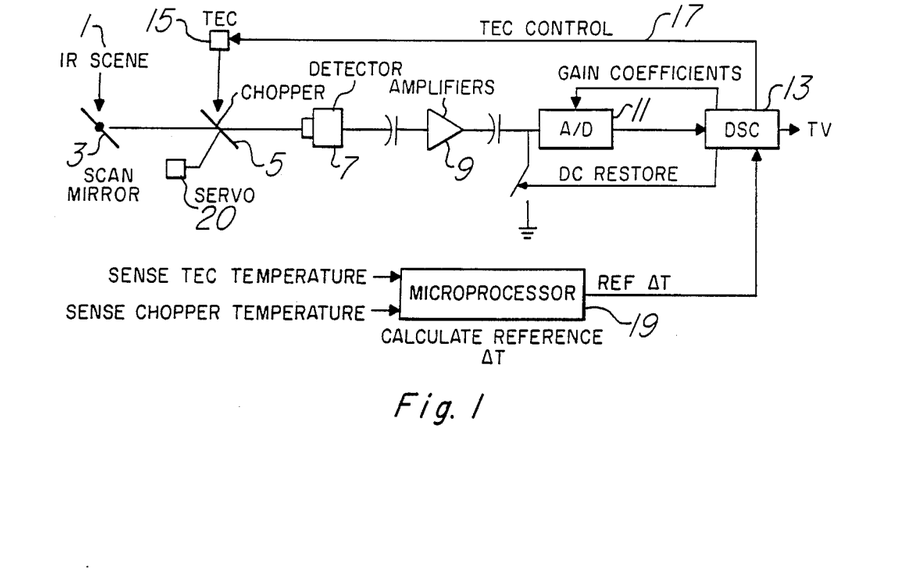
FIG. 1 is a schematic diagram of an infrared detector system in accordance with the present invention.
Figure 3:
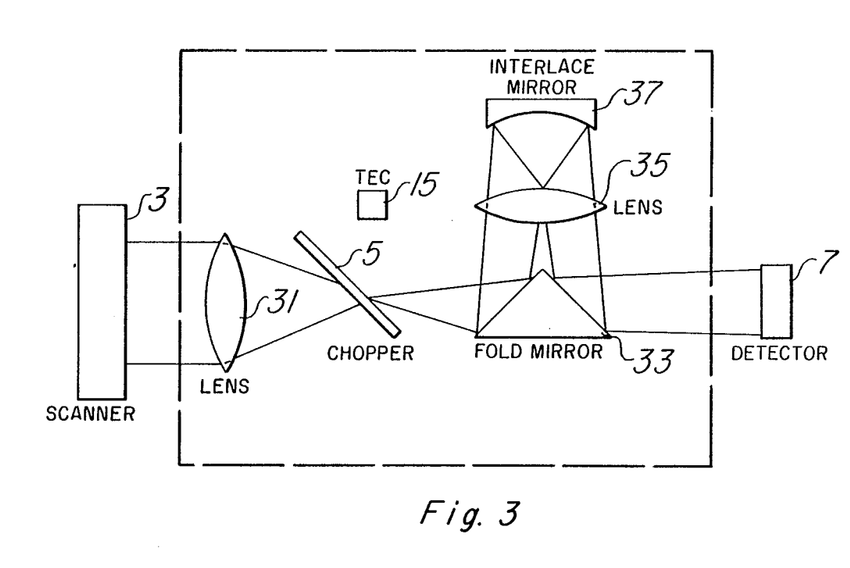
FIG. 3 is a schematic diagram of the imager optics.

Referring now to the drawings and initially to FIG. 1, there is provided an infrared detector 7 in the form of an array of infrared detector elements which views an infrared light scene 1 via a scanning mirror 3, the infrared light scene travelling through the path of a chopping mirror 5 (to be explained hereinbelow) to the detector. Optics are provided between the scanning mirror 3 and the detector 7 for focussing the scene onto the detector. The optics is shown in FIG. 3 and includes a lens 31 for focussing the infrared light from the scene being scanned onto a fold mirror 33. This light is reflected from the fold mirror 33, through lens 35 to interlace mirror 37 from which the light is reflected back through the lens 35 to the fold mirror 33 and then to the detector. The scanning mirror 3 scans the infrared energy from the scene 1 across the detector array to allow the detector elements to receive the energy across the scene in standard manner in the manner above described. The scanning mirror 3 normally scans in one direction and then rapidly retraces its path to start the next scan.

Each of the individual elements of the detector 7 produces electrical outputs which are a function of the amount of infrared light impinging thereon and the gain thereof, each output being amplified by amplifiers 9, digitized in A/D converter 11 and then operated upon in standard manner by the digital scan converter (DSC) or image processor 13 to provide an output to, for example, a TV device. However, as explained hereinabove, the individual infrared detector elements of the detector 7 do not generally each provide the same output when provided with the same input and it is this problem which is minimized in accordance with the circuitry as will be discussed hereinbelow.

During retrace of the scanning mirror 3, the chopping mirror 5, which is essentially in the shape of a triangle (which is a sector of a circle) enters the optical path and blocks off the energy from the scanning mirror 3 to the detector 7. The chopping mirror 5 is under control of a servo system 20 which causes the chopping mirror to enter the optical path only during retrace of the scanning mirror 3. During this retrace period, infrared energy from a thermoelectric source 15 impinges upon the chopping mirror 5 and reflects therefrom onto all of the elements of the detector 7 to provide a thermal reference as will be more fully described hereinbelow. The thermoelectric source in the preferred embodiment herein is a controllable thermoelectric cooler (TEC). The thermoelectric cooler is controllable to provide a desired temperature on line via a signal from the TEC control line 17 which provides control signals from the DSC 13. The DSC circuit 13 also provides gain coefficients for the A/D converter 11.

Figure 2:
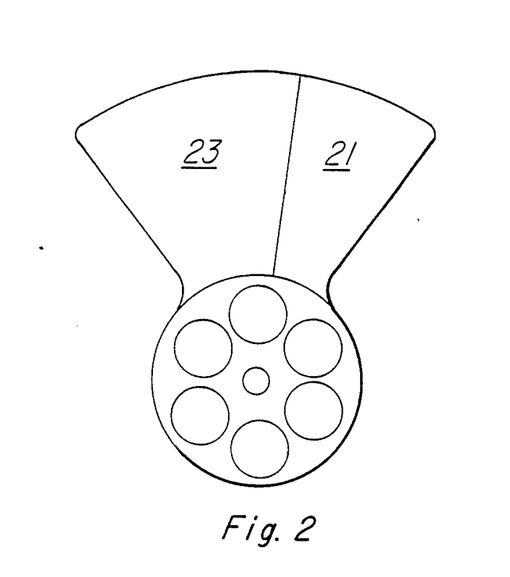
FIG. 2 is a perspective view of a chopper mirror as used in accordance with the present invention.

The energy from the thermoelectric cooler 15 is reflected onto the detector 7 during retrace by the triangular chopping mirror 5 as noted above. The triangular mirror has two sectors 21 and 23 thereon as shown in FIG. 2, each sector having a different reflectance, one sector 23 having a so-called full reflectance which is about 96% reflectance and the other sector 21 having lower reflectance, on the order of 34 to 40% reflectance. Therefore, about 96% of the energy received from at the detector 7 from the cooler 15 is reflected onto the detector 7 when the high reflectance portion 23 of the chopping mirror 5 is in the optical path and about 34 to 40% of the received energy is reflected onto the detector when the lower reflectance portion 21 of the chopping mirror is in the optical path. Accordingly, during the retrace period of the scanning mirror 3, the detector appears to be viewing a thermal reference scene followed by an apparent thermal reference scene.

Figure 4:
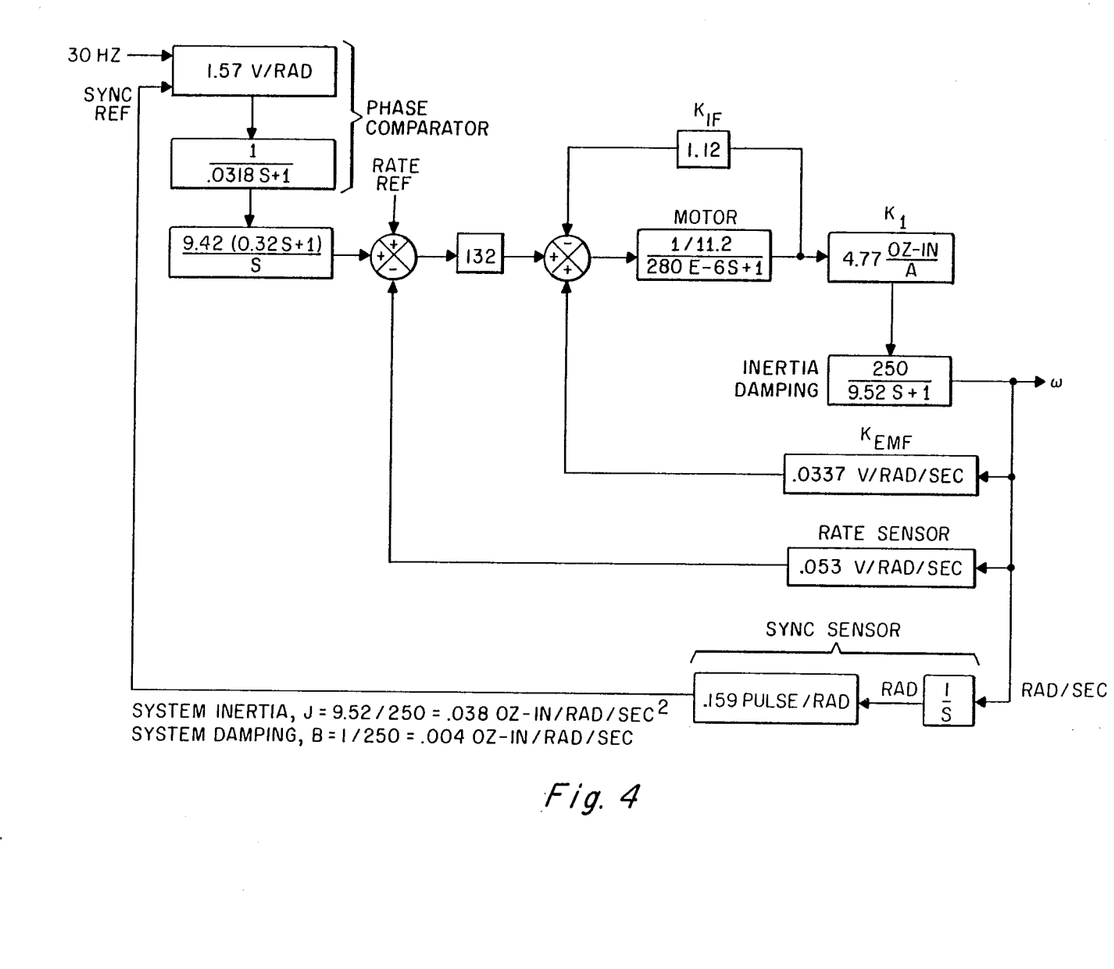
FIG. 4 is a block diagram of the chopper mirror control system.

The chopping mirror 5 rotates through the optical path such that both reflectance zones 21 and 23 are seen during scan retrace. The order in which the zones appear is not important. The action of the chopping mirror 5 is controlled by a motor driven gear train (not shown) whose speed and phase are controlled via a phase locked control loop, this loop being shown in FIG. 4 which is provided by way of an example of a typical circuit to perform such function. The ability to design such circuits is routine. The means used to sense the speed and phase of the chopping mirror in relation to the scan retrace can be, for example, a set of switches which locate index points on the rotating mirror each time the index points pass the switches.

It can be seen that each detector element in the detector 7 is subjected to the same difference in energy between the amount of infrared light projected thereon by the high reflectance surface and by the low reflectance surface of the chopping mirror.

Figure 6:
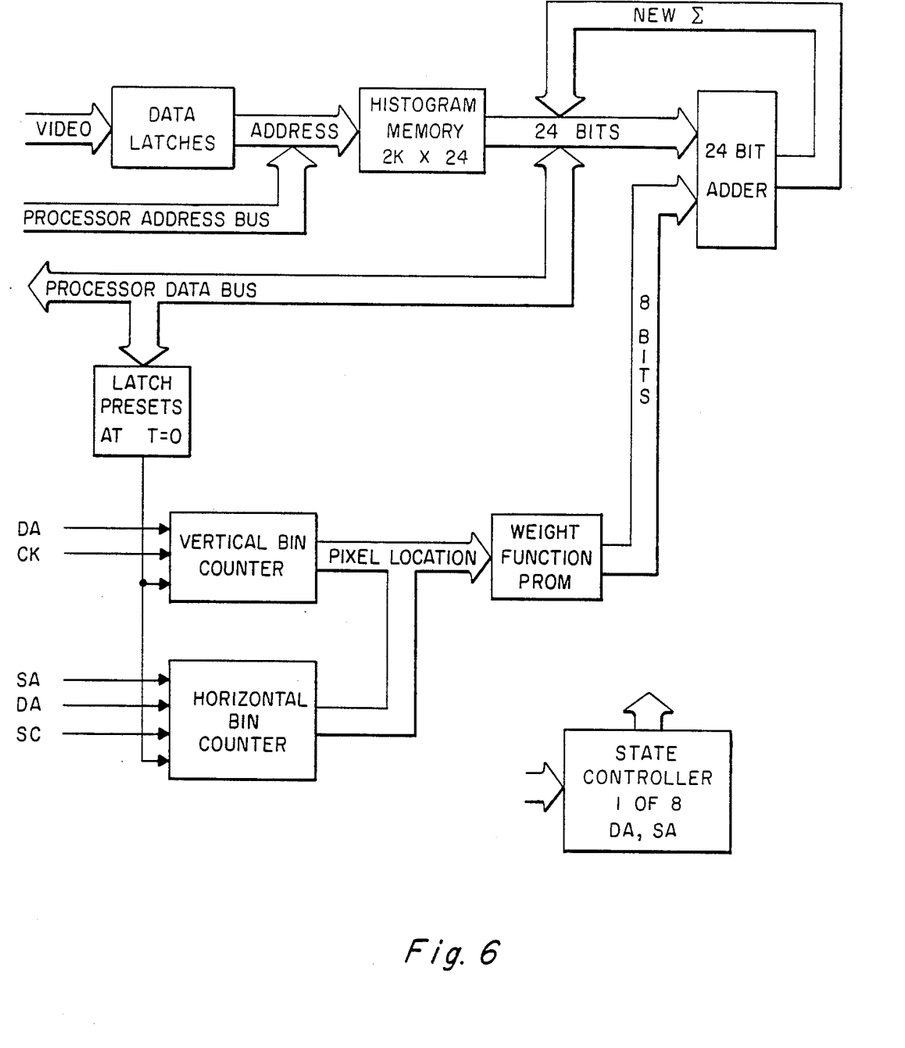
FIG. 6 is a block diagram of the histogram generator.
Figure 7:
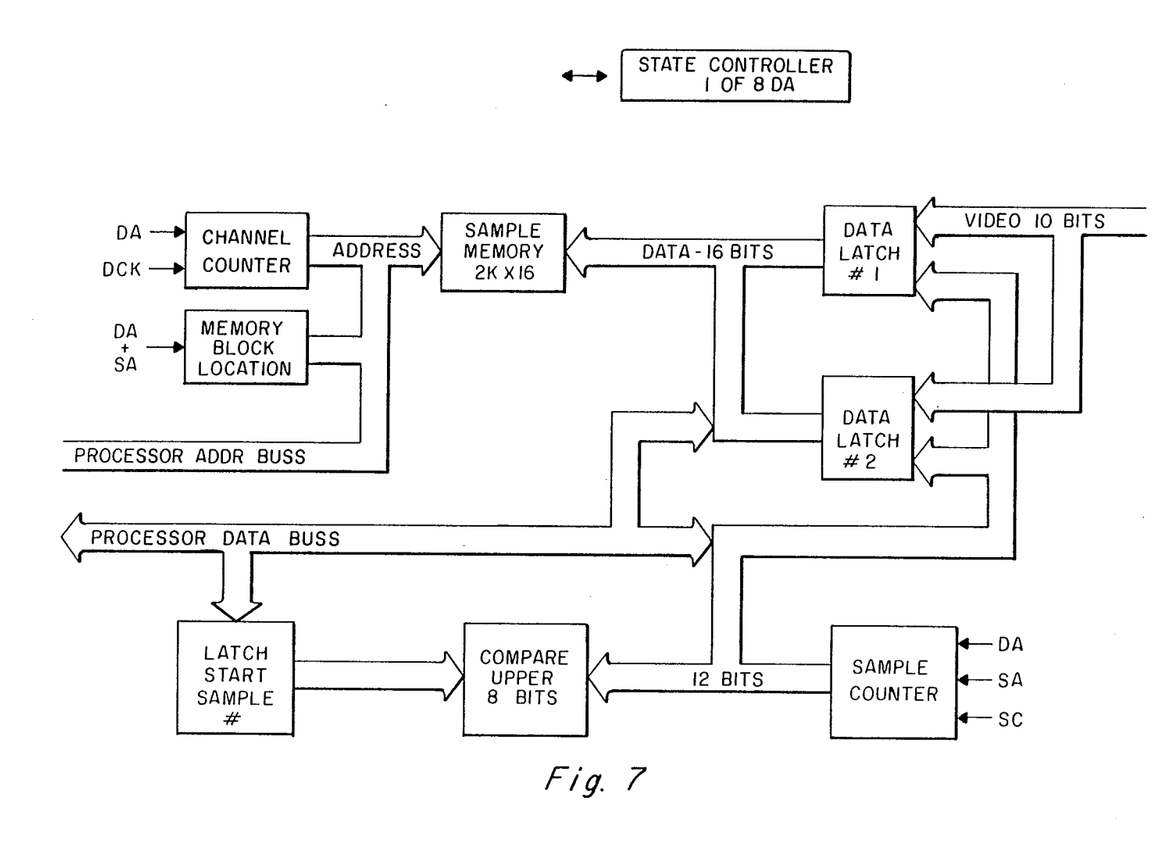
FIG. 7 is a block diagram of the video sampler.

The output of each detector element of the detector 7 is fed to the DSC or image processor 13 via the amplifiers 9 and A/D converter 11 as in the prior art. The circuitry in the DSC 13, which is shown in block diagram form in FIGS. 5 to 7, then analyzes the individual gain or output for each detector element, determines the difference between each output from each detector element and the expected value as calculated by the microprocessor 19 and then adjusts the individual channels so that the delta t or temperature change detected will register the same for each channel. In this manner each channel provides the same delta V or voltage change at its output indicative of the temperature change. This is accomplished by software and timing hardware in the DSC 13. This software and hardware determines when two different temperatures are being sampled by the detector, takes the difference therebetween and adjusts the gain for each channel so that the output from each channel is the same as the calculated apparent delta T from the microprocessor. There are two microprocessors in the system. One is in the DSC and is noted hereinabove on page 5. The other or system microprocessor 19 is in the system apart from the DSC and is mentioned several times herein. The function of the system microprocessor is to calculate the apparent delta T only.

Figure 5:
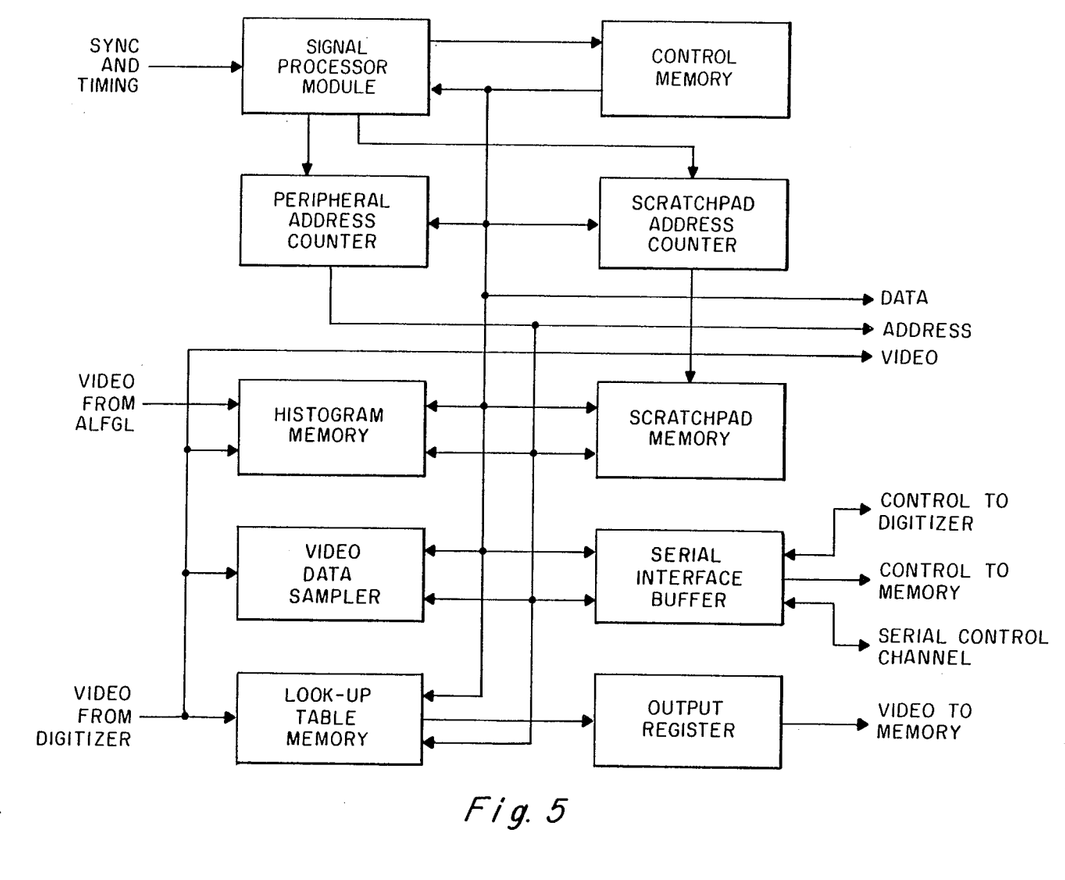
FIG. 5 is a block diagram of the image optimization processor.

The microprocessor in the DSC controls the hardware of the DSC, as stated hereinabove. The DSC microprocessor is shown in FIG. 5. It is called "Signal Processor Module" because it is from a family of microprocessors known as signal processors. The microprocessor connects to the hardware of FIGS. 6 and 7 at the points called "processor address bus" and "processor data bus" and controls operations via these connections. This is standard operation.

The microprocessors are programmed using standard computer languages. The language used for the system microprocessor is "C". The language used for the DSC microprocessor is "TMS320 Assembler[. The languages and microprocessors are not relevant to the invention herein, however. The actual programs are stored on the circuit boards near the microprocessors in permanent memories called PROMs. The microprocessors read the program instructions on a step by step basis from these PROMs. This is standard forms no part of the invention herein.

The algorithm is in the form of an equation which is a good approximation as follows:

$$delta\ V = K1[e_T T_T^4 - T_m^4] K2$$

wherein $K1 = -4.9 \times 10.14$ nominal
$T_T$ = TEC temperature in degrees Kelvin
$T_m$ = Chopper Mirror temperature in degrees Kelvin
$e_T$ = TEC emissivity = 0.99
$K_2$ = System adjustment constant between 0.25 and 4.

The algorithm shown above is used to calculate the apparent delta T which is calculated by the system microprocessor and used for the gain coefficients.

Figure 8:
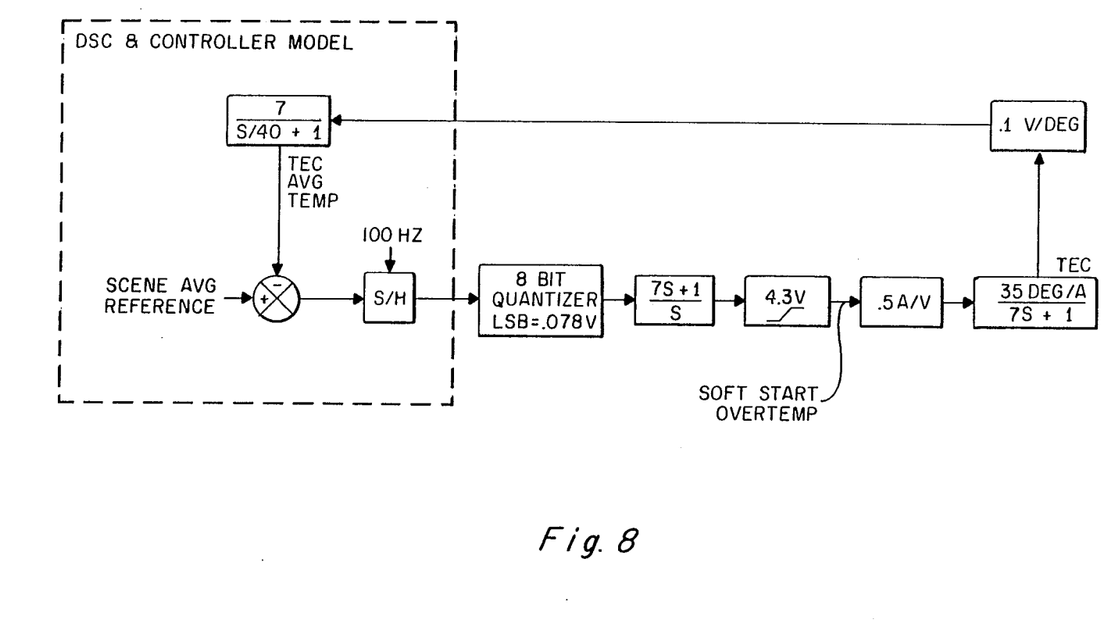
FIG. 8 is a block diagram of the TEC control.

During the flyback period of the scanner and when the high reflectance portion of the chopping mirror is in the field of view or in the optical path, the output of the amplifier of each detector element is clamped to a specific voltage while viewing the thermoelectric cooler. The thermoelectric cooler temperature is adjusted to the approximate average temperature of the scene so that the temperatures to which the system is clamped will be within the dynamic range of the scene. This number is calculated by a separate algorithm in the DSC or image processor 13 and provides the control for the thermoelectric cooler or source 15 along the TEC control line 17. FIG. 8 shows how the scene average controls the TEC.

Also provided is a system microprocessor 19 which is under the control of the TEC temperature and the temperature of the chopper mirror 5. The microprocessor 19 provides correction by taking into account the temperature of the chopping mirror 5 itself and the temperature at the TEC 15 to calculate the expected delta T as a function of those values and provide an apparent delta T value to the DSC or image processor 13. The apparent delta T is calculated from the equations set forth in the attached appendix.

Gain coefficients are the means whereby the gain of each individual channel is controllable. These coefficients are numbers ranging from 0 to 1023 which correspond to specific gain values for each channel. Changing the gain coefficient for any specific channel will alter the gain of that channel.

DC restore is a simple electronic process which assures that the DC level (or average value) of each channel is accurate with respect to the other channel levels. That is, in a given scene containing the sky and the ground, the sky is always lighter or darker than the ground because the sky is always colder than the ground. Without DC restoration, the absolute levels are meaningless in the way they relate to other channels. DC restore is accomplished by inputting a uniform thermal reference to the detector array and clamping a coupling capacitor to a uniform voltage reference at the same time. The clamp is an electronic switch closing which causes the capacitor to charge or discharge to the appropriate level required.

The chopper 5 has two separate areas of different reflectances as shown in FIG. 2 at sectors 21 and 23, sector 21 being highly reflective and sector 23 being somewhat less reflective as above stated. As the chopper 5 rotates through the optical path, the detector 7 first sees the TEC 15 at scene average temperature. This time is used for dc restoration and channel offset normalization via the clamp. The detector 7 then sees a source whose apparent delta T from background is a function of TEC temperature, mirror temperature, the two mirror reflectivities and TEC emissivity. Since the temperatures are measurable and the other parameters are known and well controlled, a reference apparent delta T is calculated, this being used by the DSC 13 to set channel gain normalization coefficients.

Though the invention has been described with respect to a specific preferred embodiment thereof, many variation and modifications will immediately become apparent to those skilled in the art. It is therefore the intention that the appended claims be interpreted as broadly as possible in view of the prior art to include all such variations and modifications.

What is claimed is:

1. A gain normalization system for an infrared detector comprising:

(a) an infrared detector array composed of a plurality of infrared detector elements, each element providing an electrical output parameter corresponding to the energy level of an infrared input applied thereto;

(b) means for applying an identical signal of a first energy level and then an identical signal of a second energy level different from said first energy level to each of said detector elements; and (c) adjusting means responsive to the electrical outputs of all of said detector elements to individually adjust the values of the output parameters from each of said detector elements;

wherein said means for applying comprises a controllable uniform temperature source and means for successively reflecting a first predetermined magnitude of the energy from said source onto said detector elements followed by reflecting a second predetermined magnitude of the energy from said source onto said detector elements, said second magnitude being different from said first magnitude.

2. A system as set forth in claim 1 wherein said means for successively reflecting comprises a movable mirror having two sectors, each sector having a different reflectivity.

3. A system as set forth in claim 1, further including a scanning mirror for transmitting an infrared scene onto said detector elements, said scanning mirror having a scanning period and a retrace period, said means for applying being operable only during said retrace period.

4. A system as set forth in claim 2, further including a scanning mirror for transmitting an infrared scene onto said detector elements, said scanning mirror having a scanning period and a retrace period, said means for applying being operable only during said retrace period.

5. A system as set forth in claim 1 wherein said adjusting means to adjust said electrical outputs further includes means responsive to said electrical outputs to control said uniform controllable temperature source.

6. A system as set forth in claim 2 wherein said adjusting means to adjust said electrical outputs further includes means responsive to said electrical outputs to control said uniform controllable temperature source.

7. A system as set forth in claim 3 wherein said adjusting means to adjust said electrical outputs further includes means responsive to said electrical outputs to control said uniform controllable temperature source.

8. A system as set forth in claim 4 wherein said adjusting means to adjust said electrical outputs further includes means responsive to said electrical outputs to control said uniform controllable temperature source.

9. A system as set forth in claim 1 further including microprocessor means responsive to the temperature of said controllable uniform temperature source and the temperature of said means for reflecting to control operation of said means responsive to the electrical outputs.

10. A system as set forth in claim 2 further including microprocessor means responsive to the temperature of said controllable uniform temperature source and the temperature of said means for reflecting to control operation of said means responsive to the electrical outputs.

11. A system as set forth in claim 3 further including microprocessor means responsive to the temperature of said controllable uniform temperature source and the temperature of said means for reflecting to control operation of said means responsive to the electrical outputs.

12. A system as set forth in claim 4 further including microprocessor means responsive to the temperature of said controllable uniform temperature source and the temperature of said means for reflecting to control operation of said means responsive to the electrical outputs.

13. A system as set forth in claim 5 further including microprocessor means responsive to the temperature of said controllable uniform temperature source and the temperature of said means for reflecting to control operation of said means responsive to the electrical outputs.

14. A system as set forth in claim 6 further including microprocessor means responsive to the temperature of said controllable uniform temperature source and the temperature of said means for reflecting to control operation of said means responsive to the electrical outputs.

15. A system as set forth in claim 7 further including microprocessor means responsive to the temperature of said controllable uniform temperature source and the temperature of said means for reflecting to control operation of said means responsive to the electrical outputs.

16. A system as set forth in claim 8 further including microprocessor means responsive to the temperature of said controllable uniform temperature source and the temperature of said means for reflecting to control operation of said means responsive to the electrical outputs.

17. A gain normalization system for an infrared detector comprising:

(a) an infrared detector array composed of a plurality of infrared detector elements, each element providing an electrical output parameter corresponding to the energy level of an infrared input applied thereto;

(b) thermal source means for providing predetermined infrared radiations; and (c) means responsive to said infrared radiations for consecutively providing both a first reference signal and then a second reference signal different from said first reference signal to said infrared detector array.

18. A gain normalization system as set forth in claim 17 wherein said means responsive to said infrared radiations is a movable mirror having two sectors, each sector having a different reflectivity.

* * * * *